(12) United States Patent
Parra

(10) Patent No.: US 6,301,481 B1
(45) Date of Patent: Oct. 9, 2001

(54) OPTIMUM MACA-BASED CHANNEL ALLOCATION FOR TDMA CALL SETUP

(75) Inventor: Ivan P. Parra, Dallas, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/221,908

(22) Filed: Dec. 28, 1998

(51) Int. Cl.[7] .............................. H04Q 7/20; H04Q 7/30; H04Q 7/32
(52) U.S. Cl. .......................... 455/450; 455/509; 455/451; 455/452; 455/63; 455/434; 455/464; 455/422; 455/513
(58) Field of Search ..................................... 455/509, 511, 455/434, 450, 437, 464, 452, 451, 67.1, 67.3, 423, 422, 63, 513, 512

(56) References Cited

U.S. PATENT DOCUMENTS

| 5,280,630 | * | 1/1994 | Wang | 455/452 |
| 5,471,671 | * | 11/1995 | Wang et al. | 455/63 |
| 5,594,949 | * | 1/1997 | Andersson et al. | 455/67.1 |
| 6,108,321 | * | 8/2000 | Anderson et al. | 455/452 |
| 6,122,517 | * | 9/2000 | Imamura | 455/450 |
| 6,219,554 |   | 4/2001 | Eswara et al. | 455/450 |

* cited by examiner

Primary Examiner—William Trost
Assistant Examiner—Keith Ferguson
(74) Attorney, Agent, or Firm—Haynes and Boone, LLP

(57) ABSTRACT

In a method of selecting a voice channel for making a telephone call via a mobile telephone, an intelligent cellular peripheral (ICP) creates and sends a mobile assisted channel allocation (MACA) list to a digital control channel (DCCH) radio. The DCCH radio sends the MACA list to the mobile telephone for scanning. The ICP assigns an acceptable carrier over interference power ratio (C/I) margin to the mobile's forward voice channel (VCH) received signal strength indicator (RSSI) during call setup. In another feature of the invention, the ICP disqualifies from further consideration the MACA channels whose noise levels are too high, and prioritizes the remaining channels in descending signal strength order.

18 Claims, 3 Drawing Sheets

OPTIMUM MACA-BASED CHANNEL ALLOCATION FOR TDMA CALL SETUP

TECHNICAL FIELD

This invention relates to mobile, or cellular, telephones, and, more particularly, to the selection of the optimum voice channel for a particular phone call.

BACKGROUND OF THE INVENTION

Reverse link clear channels can now be determined. Furthermore, mobile telephones can now report the forward noise levels of specific channels from a mobile assisted channel allocation ("MACA") list. However, the accurate and efficient determination of adequate serving voice channels, based on these reports, is a problem that has not yet been resolved.

Current channel allocation techniques compare MACA channel measurements to a fixed threshold in order to determine clear voice channels on the forward path. This approach, in addition to being restricted to only adaptive channel allocation ("ACA") calls, is not effective for all of these calls in a cell, because each call has different minimum noise level requirements. A fixed threshold would therefore be restrictive, by disqualifying many voice channels that would have otherwise served the calls with adequate carrier over interference power ratio ("C/I") levels. Furthermore, this approach simply determines pass/fail conditions for the MACA channels, instead of prioritizing them.

SUMMARY OF THE INVENTION

The present invention solves the above problem by a method of selecting a voice channel for making a telephone call via a mobile telephone. The method includes the steps of: a cell site, or base station, controller creates and sends a MACA list to a DCCH radio. The DCCH radio sends the MACA list to the mobile telephone for scanning. The ICP assigns an acceptable C/I margin to the mobile's forward VCH RSSI during call setup. In another feature of the invention, the ICP disqualifies from further consideration the MACA channels whose noise levels are too high.

DESCRIPTION OF A PREFERRED EMBODIMENT

Figure 1:
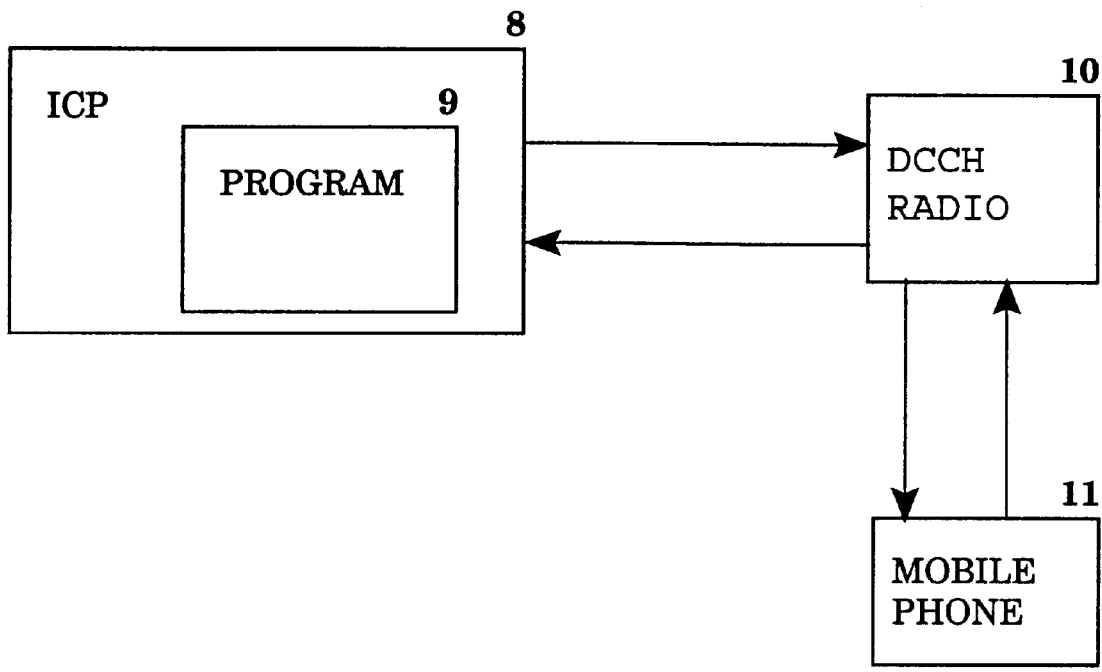
FIG. 1 is a block diagram of the apparatus of the present invention.

Referring to FIG. 1, the system of the present invention includes a base station controller, also known as an intelligent cellular peripheral ("ICP") 8, programmed with a method 9 of channel selection, a base station digital control channel ("DCCH") radio 10 in communication with the ICP 8, and a mobile telephone 11 in communication with the DCCH radio 10.

Figure 2:
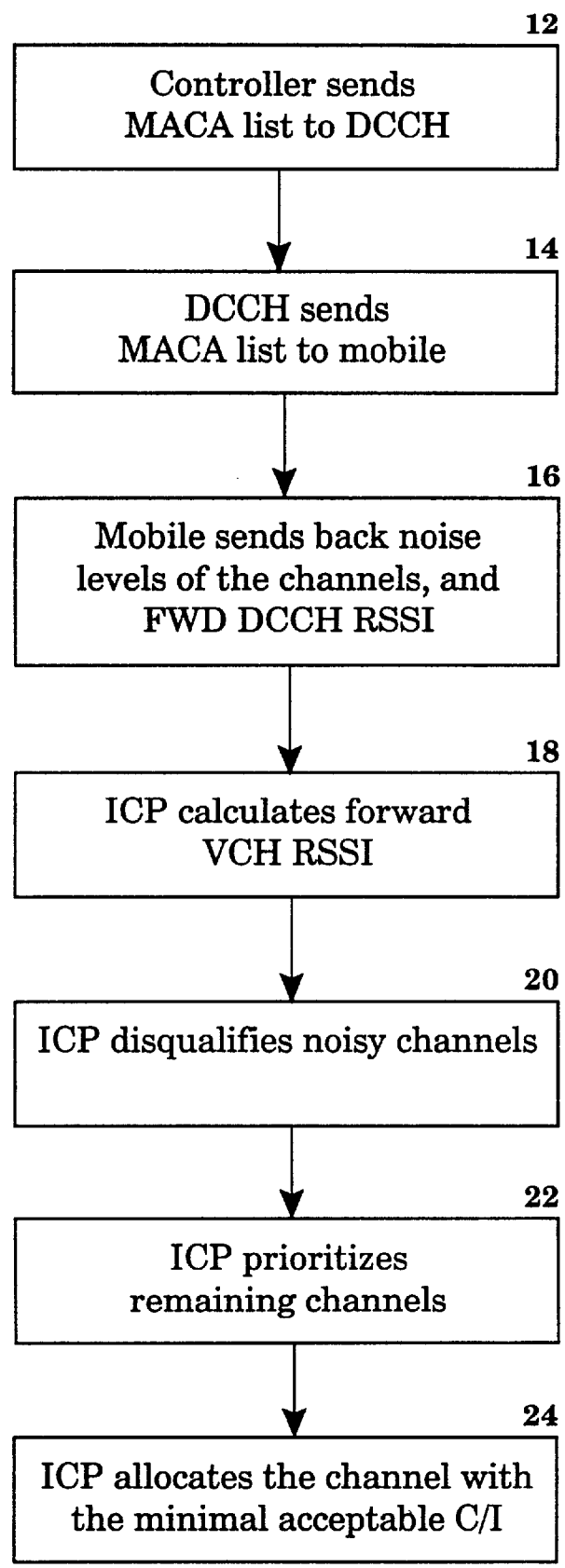
FIG. 2 is a flow chart of the method of the present invention.

Referring to FIG. 2, the method 9 of the channel allocation process of the present invention begins in step 12 when the ICP 8 creates and sends sends a list of channels that have already been found to be clear (noise free) on the reverse path, called a "MACA" list, to the DCCH radio 10. In step 14 the DCCH radio sends the MACA list to the mobile telephone for scanning. The MACA list can be made of clear channels from an ACA scan list, or from a clear channel queue list. In step 16, the mobile telephone sends an access (or page response) message, the received signal strength indicator ("RSSI") readings of the serving DCCH, and the noise levels of the channels in the MACA list.

In step 18, the DCCH digital radio unit ("DRU") passes this information to the ICP, which also has knowledge of the maximum voice channel power level ("VSAC") and maximum DCCH power level ("CSAC") values, that is, existing parameters for maximum voice channel, ("VCH") and control channel power levels, and the acceptable C/I margin for the cell (new parameter or hard-coded). The ICP uses the VSAC and CSAC values to translate the forward DCCH RSSI reading into a forward VCH RSSI reading.

In step 20, the ICP assigns an acceptable C/I margin to the mobile's forward VCH RSSI during call setup to identify the maximum allowable noise level. The ICP then disqualifies from further consideration the MACA channels whose noise levels are too high, that is, those channels whose noise levels are not at least seventeen decibels below the forward VCH RSSI reading. In an alternate embodiment, the noise levels can be fourteen or sixteen and a half decibels. In step 22, the ICP prioritizes in a list, from highest to lowest noise levels, the remaining channels. In step 24 the ICP allocates to the phone call the channel with the minimal acceptable margin.

Figure 3:
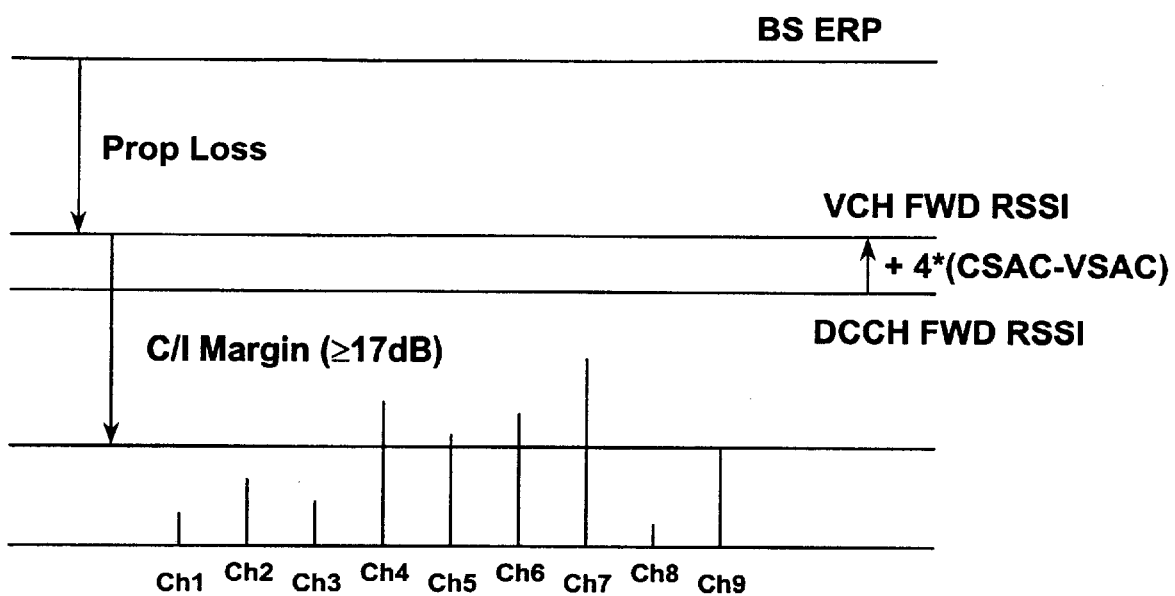
FIG. 3 is a chart showing an example of the method applied to various channels.

Referring now to FIG. 3, the BS ERP is the base station effective radiated power. That is the maximum power. That power level is then reduced by the "prop loss", which is the loss due to propagation from the base station to the mobile telephone. The ICP converts the forward DCCH RSSI (measured by the mobile telephone) into a forward VCH RSSI. The ICP takes the forward VCH RSSI, and subtracts from it a C/I margin of at least seventeen decibels. In this example of FIG. 2, the MACA list consists of nine channels. For these particular channels, the ICP recommends that the order of allocation be CH9, CH2, CH3, CH1, and CH8.

An advantage of the method of the present invention is that it makes maximal capacity and channel call quality high priorities.

What is claimed is:

1. A method of selecting a voice channel for making a telephone call via a mobile telephone, the method comprising the steps of:
   a. an intelligent cellular peripheral (ICP) creating and sending a mobile assisted channel allocation (MACA) list to a digital control channel (DCCH) radio;
   b. the DCCH radio sending the MACA list to the mobile telephone for scanning; and
   c. the ICP converting a forward DCCH received signal strength indicator (RSSI) provided by the mobile telephone to forward voice channel (VCH) RSSI, and assigning an acceptable carrier over interference power ratio (C/I) margin to the mobile's forward VCH RSSI during call setup for identifying one or more voice channels each having a noise level below a predetermined threshold.

2. The method of claim 1 wherein the step of the ICP converting further comprises the ICP disqualifying from further consideration the MACA channels whose noise levels are too high.

3. The method of claim 1 wherein the step of the ICP converting further comprises the mobile telephone sending to the DCCH radio an access message, RSSI readings of the serving DCCH, and the noise levels of the channels in the MACA list.

4. The method of claim 1 wherein the step of the ICP converting further includes the DCCH radio passing a forward DCCH RSSI, and the noise levels of the forward channels in the MACA list, to the ICP.

5. The method of claim 1 wherein the step of the ICP converting uses VSAC and CSAC values to translate the forward DCCH RSSI reading into a forward VCH RSSI reading.

6. The method of claim 1 further comprising the ICP prioritizing the identified channels.

7. The system of claim 1 wherein the means for the ICP to convert further comprises means for the mobile telephone to send to the DCCH radio an access message, RSSI readings of the serving DCCH, and the noise levels of the channels in the MACA list.

8. The system of claim 1 wherein the means for the ICP to convert further comprises means for the DCCH radio to pass a forward DCCH RSSI, and the noise levels of the forward channels in the MACA list, to the ICP.

9. The system of claim 1 wherein the means for the ICP to convert further comprises means for using VSAC and CSAC values to translate the forward DCCH RSSI reading into a forward VCH RSSI reading.

10. The system of claim 1 further comprising means for the ICP to prioritize the identified channels.

11. A system for selecting a voice channel for making a telephone call via a mobile telephone, the system comprising:
    an intelligent cellular peripheral (ICP) for creating and sending a mobile assisted channel allocation (MACA) list to a digital control channel (DCCH) radio;
    means for the DCCH radio to send the MACA list to the mobile telephone for scanning; and
    means for the ICP to convert a forward DCCH received signal strength indicator (RSSI) provided by the mobile telephone to a forward voice channel (VCH) RSSI, and assign an acceptable carrier over interference power ratio (C/I) margin to the mobile's forward VCH RSSI during call setup for identifying one or more voice channels each having a noise level below a predetermined threshold.

12. The system of claim 11 further comprising the means for the ICP to disqualify from further consideration the MACA channels whose noise levels are too high.

13. A system for selecting a voice channel for making a telephone call via a mobile telephone, the system comprising:
    an intelligent cellular peripheral (ICP) for creating and sending a mobile assisted channel allocation (MACA) list to a digital control channel (DCCH) radio;
    means for the DCCH radio to send the MACA list to the mobile telephone for scanning;
    means for the mobile telephone to send to the DCCH radio an access message, RSSI readings of the serving DCCH, and the noise levels of the channels in the MACA list;
    means for the DCCH radio to pass a forward DCCH RSSI, and the noise levels of the forward channels in the MACA list, to the ICP;
    means for the ICP to convert a forward DCCH RSSI provided by the mobile telephone to a forward voice channel (VCH) RSSI;
    means for the ICP to disqualify from further consideration the MACA channels whose noise levels are too high;
    means for the ICP to prioritize the remaining MACA channels; and
    means for the ICP to allocate at least one voice channel from the prioritized channels for making the telephone call.

14. The system of claim 13 wherein the means for the ICP to disqualify further comprises means for assigning an acceptable carrier over interference power ratio (C/I) margin to the mobile's forward VCH RSSI during call setup.

15. The system of claim 13 wherein the means for the ICP to convert further comprises means for using VSAC and CSAC values to translate the forward DCCH RSSI reading into a forward VCH RSSI reading.

16. A method for selecting a voice channel for making a telephone call via a mobile telephone, the method comprising:
    creating by an intelligent cellular peripheral (ICP) and sending a mobile assisted channel allocation (MACA) list to a digital control channel (DCCH) radio;
    the DCCH radio sending the MACA list to the mobile telephone for scanning;
    the mobile telephone sending to the DCCH radio an access message, RSSI readings of the serving DCCH, and the noise levels of the channels in the MACA list;
    the DCCH radio passing a forward DCCH RSSI, and the noise levels of the forward channels in the MACA list, to the ICP;
    the ICP converting a forward DCCH RSSI provided by the mobile telephone to a forward voice channel (VCH) RSSI;
    the ICP disqualifying from further consideration the MACA channels whose noise levels are too high;
    the ICP prioritizing the remaining MACA channels; and
    the ICP allocating at least one voice channel from the prioritized channels for making the telephone call.

17. The method of claim 16 wherein the step of the ICP disqualifying further comprises assigning an acceptable carrier over interference power ratio (C/I) margin to the mobile's forward VCH RSSI during call setup.

18. The method of claim 16 wherein the step of the ICP converting further comprises using VSAC and CSAC values to translate the forward DCCH RSSI reading into a forward VCH RSSI reading.

* * * * *